Dec. 4, 1956 A. L. HUBBARD 2,772,445
COTTON PICKER
Filed May 11, 1953 2 Sheets-Sheet 2
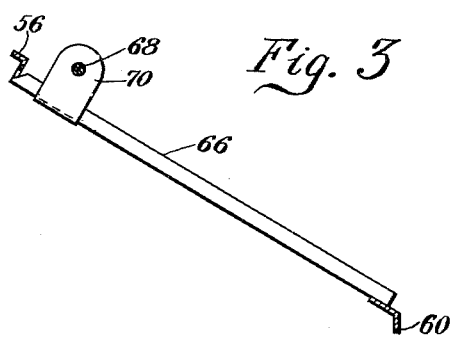
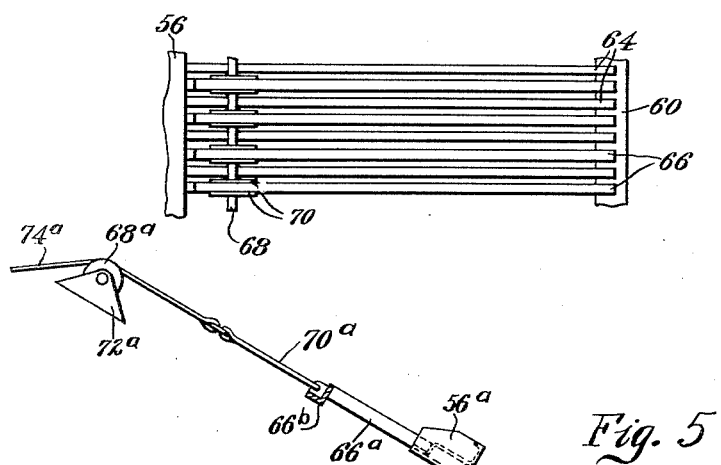
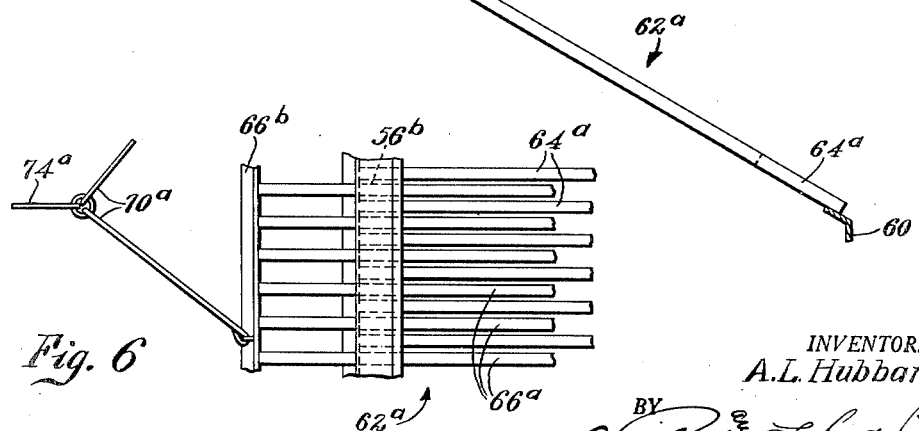
INVENTOR.
A. L. Hubbard
Attorneys

United States Patent Office 2,772,445
Patented Dec. 4, 1956

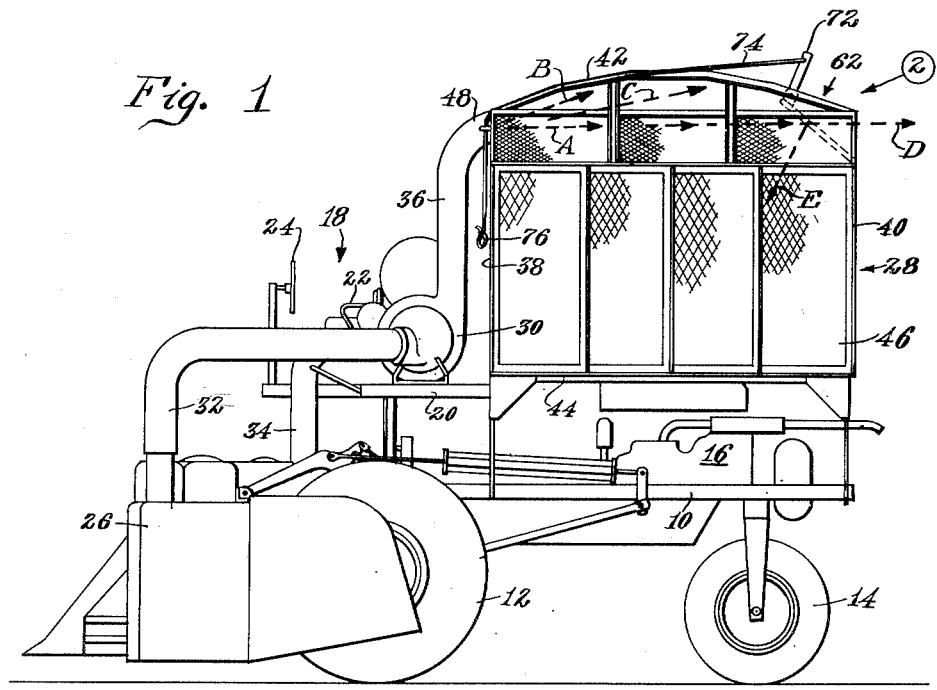
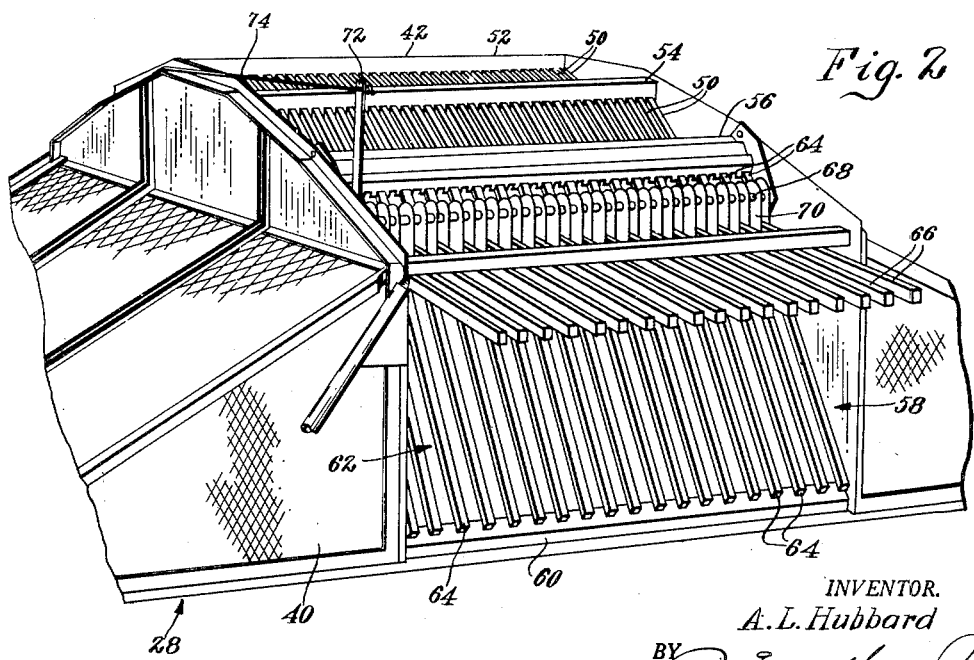

2,772,445

COTTON PICKER

Arthur L. Hubbard, Madrid, Iowa, assignor to Deere Manufacturing Co., Dubuque, Iowa, a corporation of Iowa Application May 11, 1953, Serial No. 354,206

18 Claims. (Cl. 19—72)

This invention relates to a cotton picker and more particularly to separating screen means for cleaning the picked cotton so that this cotton is separated from incidental trash.

One cotton picker of conventional construction comprises a wheeled frame—which may be a tractor or specially constructed self-propelled vehicle—on which is mounted one or more cotton-picking units which pick cotton from as many cotton rows as there are picking units as the machine advances over the field. Such conventional picker will normally include a receptacle in the form of a relatively large basket having front and rear walls, opposite side walls, a bottom, and a top. This receptacle receives picked cotton and incidental trash from the picking units by means of a pneumatic conveying system. This system will usually include a discharge conduit having its outlet at a front portion of the receptacle and effective to discharge a stream of material, including picked cotton and incidental trash, in a generally horizontal stream from the front to a rear wall (or from one side wall to the other) of the receptacle. The remote wall of the receptacle—or that wall against which the material stream impinges—conventionally includes screen means effective normally to permit the passage of incidental trash and to intercept the cotton so that the cotton will drop into the receptacle.

Generally the same principles will be utilized in a cotton picker equipped with one or more bagging attachments. That is to say, the cotton will be directed through screen means effective to pass incidental trash while intercepting cotton so that the cotton will be directed downwardly into attached bags. In some machines, conveying systems other than pneumatic are employed, but in view of the obvious advantages of the pneumatic system, that type is prevalent. The screen means of the character generally outlined above lends itself very well to the airborne material, and in normal operating conditions, the screen means performs fairly efficiently.

It often occurs, however, especially in cotton in which the incidental trash is of a relatively high percentage, that the screen means become clogged. The trash normally consists of stems, dried leaves, green leaves, fragments of bolls, and other foreign material that may be picked up from that portion of the picking unit that operates close to the ground. Since the trash and cotton is indiscriminately mixed as it travels through the pneumatic conveying system, there will be occasions in which the cotton and trash will become so intermingled as to render separation thereof substantially impossible by the conventional screen means; and the cotton will wrap itself about or "hairpin" on the grids or bars making up the screen means. As the cotton continues to "hairpin," it collects more trash—because of its linty nature—and ultimately the screen means becomes substantially imperforate. In the past, conditions of this nature were often noted by the operator in time to prevent the accumulation of an excessive amount of dirty cotton, but the operator had perforce to stop the machine, dismount therefrom, and climb up on the rear or side of the machine so that he could clean off the screen means by hand.

According to the present invention, this onerous task is eliminated by the provision of screen means comprising movable elements arranged to be moved selectively out of and back into the path of the material stream so that when the screen means becomes clogged, the operator may readily swing it to another position so that the clogged condition is eliminated either by the accumulated cotton and trash falling off by gravity or being blown off by the air stream. It is a feature of the invention to provide remote control means for operating the movable screen means.

A still further feature of the invention resides in the construction of a screen means comprising a plurality of alternately arranged and spaced grid elements, every other one of which—in one specific form of the invention—is pivoted relative to the others, whereby the pivoted elements may be swung out to a plane more nearly approaching the horizontal, thus increasing the space between the fixed elements and thereby cutting down the restriction to the material stream. At the same time, the moved grid elements, approaching a nearly horizontal plane, are easily cleaned by the air stream, since these grid elements are arranged with their free ends projecting in the direction of the air stream. In another form of the invention, every other grid element is mounted for sliding movement relative to the fixed elements, and the sliding elements are movable in unison to increase the spaces between the fixed elements and to thereby cut down the restriction to the air stream. The slidable grid elements or screen means may also be remotely controlled, which is particularly important in those machines in which the screen means is at the rear of the vehicle and the operator rides at the front of the vehicle.

A still further feature of the invention resides in the provision of improved screen means, in either of the forms mentioned above, or their equivalents, that may be readily attached to cotton-picking machines of existing types.

The foregoing and other important objects and desirable features inherent in and encompassed by the invention will become apparent as two preferred embodiments of the invention are disclosed in the following detailed description and accompanying sheets of drawings in which—

Fig. 1 is a side elevational view of a representative type of cotton picker having one or more picking units, a pneumatic conveying system, and a cotton-receiving receptacle.

Fig. 2 is an enlarged fragmentary perspective view, as seen generally in the direction of the arrow bearing the encircled numeral 2 in Fig. 1, this figure illustrating that form of the invention in which alternate grid elements are pivoted relative to fixed elements; the view shows the pivoted elements swung out of their normal operating position.

Fig. 3 is a sectional view, on a scale somewhat larger than that of Fig. 2, showing the pivotal mounting of one of the movable grid elements.

Fig. 4 is a fragmentary plan view of the structure illustrated in Fig. 3.

Fig. 5 is a sectional view of that form of the invention in which alternate grid elements are slidable relative to fixed elements, the view illustrating the position generally of the slidable elements partially moved relative to the fixed elements.

Fig. 6 is a fragmentary plan view of the structure shown in Fig. 5.

The cotton picker chosen for the purposes of illustration is of the self-propelled type comprising a mobile frame 10 carried at its forward end on a pair of traction wheels 12 (only one of which is shown) and at its rear end on a single steerable truck 14. The machine may be powered by a conventional internal combustion engine, represented generally by the numeral 16. The forward portion of the main frame 10 carries an operator's station 18 made up of a platform 20 and seat 22. Ahead of the seat is a steering wheel 24 connected in any conventional manner to steer the steerable truck 14.

One or more cotton-picking units, such as designated generally by the numeral 26, may be carried ahead of the traction wheels 12. Although these units may be mounted in number equal to the number of rows from which they are intended to pick simultaneously, it will be assumed here, for the purposes of clarity and convenience, that the machine has only a single picking unit. Since this unit may be conventional or based on any one of the several well known types of picking units, the detailed description of the component parts thereof will be omitted. Suffice it to say that as the machine is driven forwardly over the field, the picking unit 26 receives standing cotton plants and mechanism within the unit picks or otherwise removes the cotton from the plants.

The rear portion of the main frame 10 supports a receptacle or basket 28 and picked cotton from the picking unit 26 is supplied to the basket by means of a pneumatic conveying system comprising a blower fan 30 mounted on the platform 20, a pair of intake conduits 32 and 34 and a discharge conduit 36. The basket 28 has front and rear walls 38 and 40, a top 42, a bottom 44 and opposite side walls 46 (only one of which is shown).

The discharge conduit 36 of the pneumatic conveying means has its upper end formed as a discharge outlet 48 which enters through an opening (not shown) in an upper portion of the receptacle front wall 38. When the pneumatic conveying system is in operation, it discharges a stream of air in a generally horizontal path as indicated by the arrows A in Fig. 1. When the machine is picking cotton, picked cotton and incidental trash will follow generally the same path A through the basket from the front wall 38 to the rear wall 40.

As best seen in Fig. 2, the upper intermediate portion of the top wall 42 is in the form of separating means comprising a plurality of screen elements or grid bars 50 arranged at various angles to and above the air stream A. In view of the curvature of the elbow forming the discharge outlet 48, the air and material streams will diverge, as generally represented by the arrows B and C. Since the grid elements 50 in the top wall 42 are substantially parallel to the material stream as represented by the arrows A, B and C, very little clogging will occur, and it is accordingly conventional practice to fix the grid elements 50 in place in appropriate cross members 52, 54 and 56. Consequently, as material including picked cotton and incidental trash is blown through the front wall 38 of the receptacle 28, the trash is expected to pass through the grid elements and the cotton will be intercepted to drop into the receptacle.

As best seen in Fig. 1, a rear wall portion, identified generally by the numeral 58, is at a substantial angle to the air and material stream. Experience has shown that it is this wall, and the screen means provided therein, that becomes clogged by an accumulation of excessively trashy cotton. According to the present invention, these disadvantages are eliminated in a simple and novel manner.

The upper portion of the rear wall 40 of the receptacle 28 has a transverse member in the form of an angle bar 60. This angle bar and the transverse member 56 previously referred to serve to support the novel screen means, which, for purposes of identification, is denoted in its entirety by the numeral 62.

In that form of the invention shown in Figs. 1 through 4, the screen means 62 comprises a plurality of screen or grid elements 64 fixed at their opposite ends respectively to the cross members 56 and 60 and spaced apart in a plane transverse and at a substantial angle to the air and material stream A. The screen or grid elements 64 constitute a first set of coplanar elements fixedly mounted in position in the wall portion 58. Whether or not the wall portion 58 is considered part of the top wall 42 or the rear wall 40 of the receptacle is immaterial.

The screen means 62 comprises a second set of screen or grid elements 66. These are coplanar and are spaced apart at such intervals as to loosely interfit with the fixed grid elements 64. Each of the grid elements 66 is fixedly mounted at one end on mounting means including a transverse rockshaft 68, a plate in the form of an arm 70 being preferably welded to both the free end of the element 66 and to the rockshaft. The elements 66 are thus arranged so that they are movable in unison about the axis of the rockshaft. In their normal positions, the second set of grid elements comprising the elements 66 is coplanar with the first set comprising the elements 64, which may be appreciated by assuming that the elements 66 in Fig. 2 have been swung downwardly and forwardly to lie respectively between the elements 64. Consequently, the spaces between the elements 64 and 66 will be on the order of the spacing between the fixed elements 50 in the top wall 42 of the receptacle 28 and the restriction set up will normally be sufficient to screen out the incidental trash as the air stream A, along with material carried by it, is directed rearwardly. Accordingly, incidental trash will be expected to pass rearwardly, as represented by the arrow D (Fig. 1) and the cotton will be intercepted and directed downwardly as represented by the arrow E (also Fig. 1).

When the cotton picker is operating with the screen means 62 in its normal or operating position—that is, with all the elements 64 and 66 coplanar in a plane at a substantial angle to the horizontal air and material stream—the restriction to the passage of cotton is substantially great, so that it is expected that a maximum amount of cotton will be intercepted for direction to the receptacle (arrow E, Fig. 1) and the trash will depart in the direction of the arrow D (also in Fig. 1). However, in excessively trashy conditions, the cotton and trash will accumulate on the screen means 62 and will ultimately reach such magnitude as to completely or substantially completely clog the screen means, thus destroying its separating or cleaning function. If this condition is allowed to persist, cotton impinging against the clogged screen means 62 will not be cleaned or separated from the incidental trash. However, according to the present invention, the set of grid or screen elements 66 may be swung outwardly to the position shown in Fig. 2. The control of the grid elements is facilitated by remote control means comprising an upright arm 72 fixed to the rockshaft 68 and having a remote control element in the form of a rope 74 that extends forwardly over the top 42 of the receptacle 28, terminating in a handle 76 in close proximity to the operator's station 18. Accordingly, the operator may simply reach behind him, grasp the handle 76 and pull the rope 74 to rock the rockshaft 68 and with it the movable grid or screen elements 66. Any accumulated cotton and/or trash adhering in part to the elements 64 and 66 will be torn loose as the elements 66 are swung outwardly. Any cotton adhering primarily to the elements 66 may drop off as the elements 66 are swung to their cleaning positions. Since the elements 66, when moved to their cleaning position, occupy substantially a plane parallel to the air and material stream A—or a position in which their common plane more nearly approaches the horizontal—the air stream will serve to dislodge adhering cotton and trash, especially since the rear or free ends of the elements 66 project in the direction of the air and material stream. Of course, a small portion of cotton may be lost during this phase of the operation, but the tremendous advantages gained by being able to control the screen means remotely more than off-sets the small loss of cotton. Furthermore, it is not expected that the elements 66 will remain long in their opened or cleaning position, because usually a quick movement of the elements outwardly and a return thereof to their initial plane will be sufficient to eliminate the clogged condition. The elements 66 return, of course, to their initial position by virtue of their own weight. If desired, the elements could be additionally biased for return to normal or operating position.

In the modified form of the invention shown in Figs. 5 and 6, a screen means 62a may be substituted in the receptacle wall portion 58 for the screen means 62 previously described. The modified form of screen means comprises alternate elements 64a and 66a, the elements 64a comprising a fixed set secured at their lower or rear ends to the cross member 60 of the rear wall of the receptacle and their upper ends being secured to a transverse support 56a substituted for the transverse member 56 of the previously described modification. The transverse support 56a is of box section as shown in Fig. 5 and has a plurality of transversely spaced guide means 56b for slidably carrying and guiding the movable elements 66a. The upper ends of the elements 66a are connected to a transverse member 66b and the free ends of the elements 66a are unsupported. The elements 64a and 66a are alternately loosely interfitted as in the case of the elements 64 and 66, the primary difference between the two forms of the invention being that the set of elements comprising the elements 66a is slidable rather than swingable relative to the fixed elements.

In Figs. 5 and 6, the set of elements 66a is shown in a partly opened position. When completely closed, the restriction set up in the screen means 62a is comparable to that of the screen means 62 previously described.

The remote control means for the form of the invention shown in Figs. 5 and 6 may include a control rope 74a trained about a sheave 68a that is supported in a bracket 72a on a convenient portion of the receptacle. The forward end of the rope 70a may extend within easy reach of the operator's station as in the case of the rope 74. The rear end portion of the rope 74a may be suitably connected, as at 70a, to the transverse support 66b to which the elements 66a are secured.

With the exception noted above, the screen means 62a operates very much like the screen means 62 and repetition of duplicating characteristics is deemed to be unnecessary. In both cases, the feature resides in the relative movability of the fixed and movable screen elements so as to facilitate the elimination of clogged conditions which, combined with remote control, materially increase the efficiency of the machine, especially when used in connection with mobile cotton pickers, because there is elminated, for one thing, the necessity for the operator to dismount and to manually clean out the clogged condition at the rear of the machine.

Other features of the invention not specifically enumerated will undoubtedly occur to those versed in the art, as will numerous modifications and alterations in the preferred forms of the invention illustrated, all of which may be achieved without departing from the spirit and scope of the invention.

What is claimed is:

1. In a cotton picker in which conveying means having an outlet discharges a stream of material including picked cotton and incidental trash into a receptacle and against separating screen means spaced from the outlet so that trash normally passes through the screen means and outward of the receptacle and cotton is intercepted and retained in the receptacle, the improvement residing in the screen means, comprising: a plurality of screen elements spaced apart to provide such screen means; means mounting certain of the screen elements for movement out of the material stream to remove the restriction by said certain of the screen elements to the material stream; and means connected to and for moving said certain of the screen elements selectively out of and back into the material stream.

2. In a cotton picker having a pneumatic cotton-conveying system including a conduit provided with an outlet for discharging a stream of material including picked cotton and incidental trash into a receptacle and against a remote wall portion of the receptacle having separating screen means spaced from the outlet and arranged at an angle to the stream so that trash normally passes through the screen means and cotton is intercepted and directed to the receptacle, the improvement residing in the screen means comprising: a plurality of screen elements providing the screen means and spaced apart in an initial plane at an angle to the material stream; means mounting certain of the screen elements on the receptacle for movement out of said initial plane and into a plane more nearly parallel to the stream; and means connected to and for moving said certain of the screen elements selectively from one plane to the other.

3. In a cotton picker having a pneumatic cotton conveying system including a conduit provided with an outlet for discharging a stream of material including picked cotton and incidental trash into a receptacle and against a remote wall portion of the receptacle having separating screen means spaced from the outlet and arranged at an angle to the stream so that trash normally passes through the screen means and cotton is intercepted and directed to the receptacle, the improvement residing in the screen means comprising: a plurality of grid elements providing the screen means and spaced apart transversely of the material stream in an initial plane at an angle to the material stream; means mounting certain of the grid elements on the receptacle for movement out of said initial plane and into a plane more nearly parallel to the stream so that said certain of the grid elements lie substantially lengthwise of the material stream; and means connected to and for moving said certain of the grid elements selectively from one plane to the other.

4. The invention defined in claim 3, in which: the means mounting said certain of the grid elements includes a movable support connected to one end of said certain of the grid elements, the other ends of said certain of the grid elements being free, and the mounting being such that when said certain of the grid elements are moved out of said initial plane the free ends project in the direction of the material stream.

5. The invention defined in claim 4, in which: the mounting means includes a pivot for the support so that movement of said certain of the grid elements is angular.

6. In a cotton picker in which conveying means having an outlet discharges a stream of material including picked cotton and incidental trash against separating screen means spaced from the outlet so that trash normally passes through the screen means and cotton is intercepted and directed to a receiving means, the improvement residing in the screen means, comprising; a support and a plurality of spaced apart screen elements arranged in cooperative first and second tests, the elements in the first set lying generally in a common plane and fixed to the support and the elements in the second set loosely interfitting and normally coplanar with those in the first set; and means mounting the elements in the second set on the support for selective movement out of and back into said loosely interfitting relationship with the elements in the first set.

7. The invention defined in claim 6, in which: the mounting of the second set of elements is such that all of the elements in said second set are movable in unison.

8. The invention defined in claim 7, in which: the mounting of said second set of elements comprises a pivot on an axis parallel to the plane of the elements so that said second set is swingable relative to the first.

9. The invention defined in claim 7, in which: the mounting of said second set of elements includes guide means cooperative between the support and said second set and providing for sliding of said second set relative to the first.

10. The invention defined in claim 9, in which: the guide means is generally parallel to the plane of the elements so that the sliding movement of said second set is selectively away from and back toward the first set in the plane of the elements.

11. In a cotton picker in which conveying means having an outlet discharges a stream of material including picked cotton and incidental trash against separating screen means spaced from the outlet so that trash normally passes through the screen means and cotton is intercepted and directed to a receiving means, the improvement residing in the screen means, comprising: first and second spaced apart parallel supports; first and second sets of cooperative screen elements arranged with the elements in the first set in the form of generally coplanar fingers, each fixed at one end to the first support and projecting toward the second support and with the elements in the second set in the form of generally coplanar fingers, each fixed at one end to the second support and projecting toward the first support in alternating interspaced relationship with the first set of fingers, all of said fingers being normally generally coplanar, and means mounting the first and second supports for movement relative to each other to selectively move one set of fingers out of and back into said interspaced relationship with the other set of fingers.

12. The invention defined in claim 11, in which: the supports are related for relative angular movement about an axis generally parallel to the common plane of the fingers.

13. The invention defined in claim 11, in which: the supports are related for relative separation lengthwise of the fingers to selectively separate and return the supports respectively away from and back toward each other.

14. A cotton cleaning unit comprising: a container having oppositely disposed wall portions, one of the wall portions having an inlet therein for receiving in the container a material stream of picked cotton and trash directed at an opening in the opposite wall portion; screen means carried by the opposite wall portion in said opening and including a plurality of spaced apart screen elements generally in the plane of the opening and normally effective to afford a restriction for intercepting the stream to cause cotton in the stream to be directed to the bottom of the container while permitting trash to pass through the screen means other than larger and incidental trash which is retained in the screen means, and means mounting certain of the screen elements on said opposite wall portion for movement out of the opening to permit removal of the larger and incidental trash accumulated against the screen means.

15. The invention defined in claim 14, in which the means mounting certain of the screen elements on the opposite wall portion is in the form of a fixed support, a rockshaft carried by the fixed support and having said certain of the screen elements affixed thereto whereby rocking of the rockshaft will cause said certain of the screen elements to move toward or away from the opening in the opposite wall portion.

16. The invention defined in claim 15, further characterized by means including a rockarm connected to the rockshaft and adapted to rotate the rockshaft for selectively positioning said certain of the screen elements.

17. The invention defined in claim 14, in which said certain of the screen elements are fixed to a movable support, and further characterized by means connecting the movable support to the opposite wall portion for selectively sliding said certain of the screen elements across said opening.

18. A cotton cleaning unit comprising: a container having oppositely disposed wall portions, one of the wall portions having an inlet therein for receiving from a pneumatic cotton conveying system a material stream of picked cotton and trash directed by a blast of air issuing from said system at an opening in the opposite wall portion; screen means carried by the opposite wall portion in said opening and including a plurality of spaced apart screen elements generally in the plane of the opening and normally effective to afford a restriction for intercepting the stream to cause cotton in the stream to be directed to the bottom of the container while permitting trash to pass through the screen means other than larger and incidental trash which is retained in the screen means, and means mounting certain of the screen elements on said opposite wall portion for movement out of the opening to permit removal of the larger and incidental trash accumulated against the screen means by said air blast directing said stream of commingled picked cotton and trash.

References Cited in the file of this patent

UNITED STATES PATENTS

| | | |
|---|---|---|
| 686,980 | Lippy | Nov. 19, 1901 |
| 759,151 | Benefield | May 3, 1904 |
| 820,434 | McMyler | May 15, 1906 |
| 1,418,284 | Caretto | June 6, 1922 |
| 1,588,881 | Evans | June 15, 1926 |
| 1,608,640 | Wilson | Nov. 30, 1926 |
| 1,679,280 | Towns | July 31, 1928 |
| 1,941,124 | Ziegler | Dec. 26, 1933 |
| 2,645,821 | Fowler | July 21, 1953 |